Figure 2:
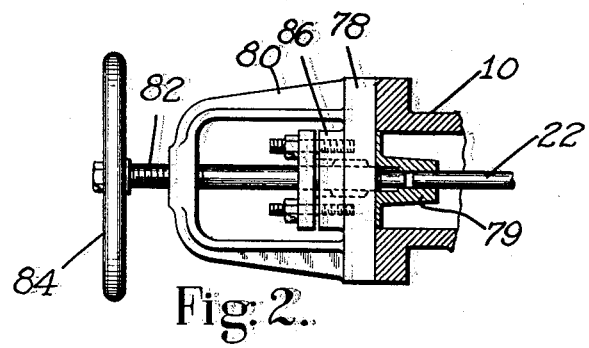

March 13, 1934.   W. A. HEANEY   1,950,728
VALVE
Filed March 26, 1929

INVENTOR
William A. Heaney.
by H. W. Kenway. Att'y

UNITED STATES PATENT OFFICE 1,950,728

VALVE

William A. Heaney, Salem, Mass., assignor to Locke Regulator Company, Salem, Mass., a corporation of Massachusetts Application March 20, 1929, Serial No. 350,064

3 Claims. (Cl. 137—139)

This invention relates to automatic stop valves for use in steam engine and turbine installations.

It is the practice to place in the main steam header leading to the steam engine or turbine a valve acting automatically to shut off the supply of steam should any accident or sudden reduction in load permit the engine to race. For considerations of safety, it is important that the valve should respond instantly to delicate controlling mechanism reliably and without danger of sticking. Moreover, the valve must remain wide open and afford full and free passage of the steam during the normal operation of the engine and close tightly when it is called upon to act. The conditions of high pressure and temperature to which a shut-off valve is subjected introduce many practical difficulties of mechanical design which must be solved in providing a valve of the qualifications herein outlined. For example, the force required to close a valve of substantial area against high steam pressure is of considerable magnitude and unless balanced would require moving parts of weight too great for rapid movement. Further, expansion caused by the temperature of high pressure steam in the moving parts of the valve must be reckoned with and the design must be such as to be tight throughout a wide range of temperature.

I have discovered that a valve possessing all the required advantages and others which will appear hereinafter, may be provided by forming a pressure chamber within the valve casing for a piston carried by the stem of the main valve, in combination with a trip-controlled auxiliary valve for governing the pressure within the pressure chamber. Preferably, the piston is utilized also as means for guiding the main valve in its movement toward and from its seat. Steam under high pressure is permitted to fill the pressure chamber, thus balancing the pressure of the system upon the piston and permitting the pressure upon the valve itself to hold the valve in its wide open position. The auxiliary valve is normally open but may be closed and maintained closed by a latch mechanism which may be tripped in response to slight movement by the governor or other controlling device, to exhaust the pressure chamber and render the full pressure of the system effective upon the piston instantly to close the main valve.

As herein shown and in accordance with another feature of the invention, the main valve is guided in its movement by means contained entirely within the valve casing, thus eliminating all outside stuffing boxes and rendering the valve particularly tight against leakage. For convenience in manufacture and because it is otherwise structurally advantageous, the auxiliary valve and the mechanism by which it is held to its seat are formed in or carried by a removable head of the valve casing. The valve spindle is extended in both directions from the body of the valve and while one end of the stem is guided by the piston traveling in the pressure chamber, the other is guided by means carried upon the interior face of a second valve casing head.

Figure 1:
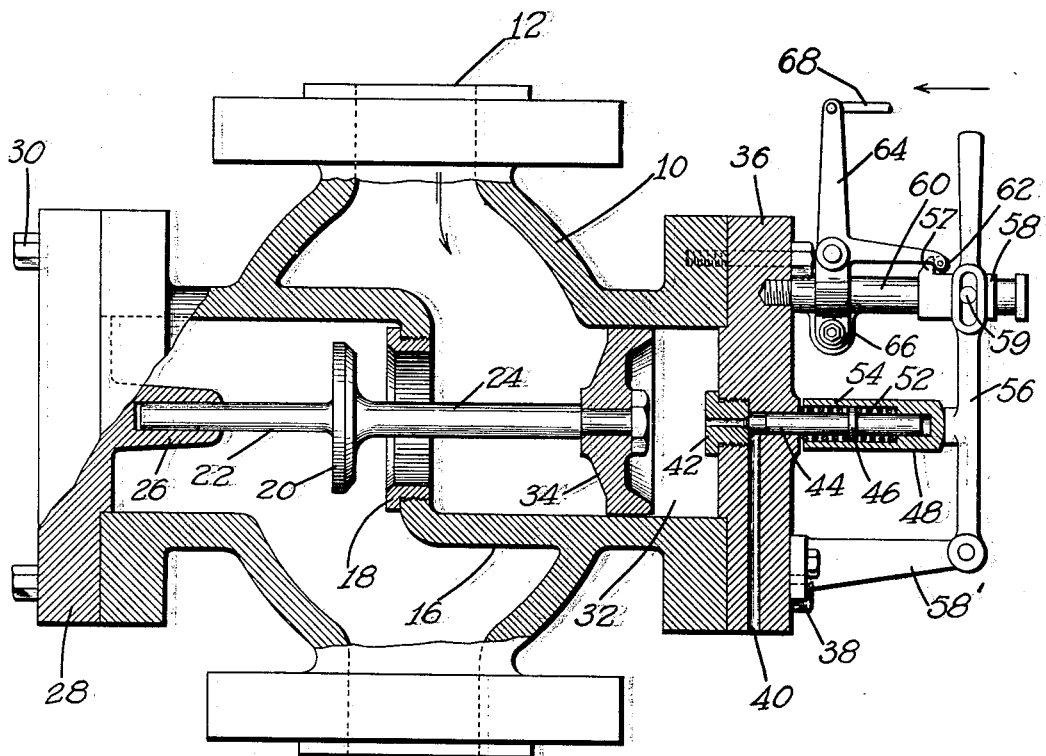

These and other features of the invention will be best understood and appreciated from the following description of a preferred embodiment thereof, selected for purposes of illustration and shown in the accompanying drawing, in which Fig. 1 is a view of the valve in longitudinal section; and Fig. 2 is a fragmentary view illustrating the valve as modified to act also as a throttle valve.

The valve casing 10 is provided with an inlet opening 12 and an outlet opening 14 and contains a chamber separated into two parts by a partition 16, in which is contained the valve seat ring 18. The valve disk 20 is shaped to fit the valve seat and has stems 22 and 24 extending in both directions. The outer end of the stem 22 is received in a longitudinal bore formed in a boss 26 projecting inwardly from the inner face of a cover disk 28 secured to the valve casing by bolts 30. The bore in the boss 26 is located axially in alignment with the axis of the valve seat and thus guides the valve stem accurately in the movement of the valve 20 toward and from its seat.

Upon its inlet side, the casing is shaped to form a cylindrical pressure chamber 32 disposed axially in alignment with the valve seat 18 but of substantially greater cross sectional area. A piston 34 is secured to the outer end of the valve stem 24 and works in the pressure chamber 32, fitting the same closely enough to be accurately guided in its movement but at the same time permitting leakage of steam past its walls so that steam pressure on both sides of the system is substantially equalized.

The outer end of the pressure chamber 32 is closed by a cover plate 36 bolted to the casing by bolts 38 and having formed therein an outlet passage 40 which communicates with the pressure chamber 32 through a passage formed in a plug 42 threaded into the inner face of the cover 36 and having a valve seat formed in its outer end. An auxiliary valve 44 is adapted to be seated upon the valve seat of the plug 42 in a manner closing the pressure chamber and maintaining pressure therein. The auxiliary valve 44 comprises a plunger having an intermediate collar 46 and being retained within a sleeve or thimble 48. The compression spring 52 is located between the collar 46 and the outer end of the sleeve 48, and a second compression spring 54 is located between the inner end of the collar 46 and the outer surface of the cover plate 36. The spring 54 operates to normally move the valve to a position away from its seat and hold it in such position, thus leaving open the port into the chamber 32. The spring 52 acts on the thimble 48 to force it outwardly on the valve stem. The valve plunger is held to its seat by a lever 56, pivotally mounted upon a bracket 58' secured to the cover plate 36 and having a boss which engages the outer end of the sleeve 48, which thus acts through the compression spring 52 upon the auxiliary valve plunger.

The lever 56 is connected to a block 58 arranged to slide freely upon a stud 60 projecting from the cover plate 36. The block 58 carries a transversely extending pin 59 which is received in a slot formed in the lever 56 and thus constitutes a connection between the lever and the sliding block. The block 58 has also a latch projection or tooth 57 arranged to be engaged by a roller 62 carried by a latch piece 64 pivotally mounted upon an ear 66 projecting from one side of the stud 60. The outer end of the latch piece 64 may be connected by a rod 68 to the engine or turbine governor or to any other controlling device in the system.

It will be understood that when the rod 68 is moved to swing the latch piece 64 in a counter clockwise direction, the latch is tripped by the disengagement of the roller 62 from the tooth 57 and the lever 56 released, whereupon both the compression springs 52 and 54 are permitted to expand and the sleeve 48 and the auxiliary valve plunger are thrown outwardly from the auxiliary valve seat. When this occurs, the pressure chamber 32 is immediately exhausted and the high pressure of the system is effective to force the piston 34 toward the right, instantly closing the main valve 20 and holding it tightly shut on account of the greater effective area of the piston 34 as compared to the body of the valve 20.

It will be observed that since the auxiliary valve 44 is normally retracted to a position leaving the port into the chamber 32 open, the main valve 20 will always be closed unless the latch 64 is engaged with the tooth 57. Thus, unless and until a positive act (engaging of the latch 64 with the tooth 57) is performed, the main valve 20 will remain closed and no steam can pass through the line. It will be understood, therefore, that by the term "normal" as herein used I mean the position the parts occupy by themselves when under no restraint. The importance of this feature of the invention should be apparent when it is considered that a mechanism having a relatively reverse operation of the parts would permit the main valve to remain open to the passage of steam under normal conditions, thereby causing possible damage. In brief, applicant's normally closed main valve mechanism requires the positive operation of a controlling element when it is desired that steam shall pass through the main line. If the operator should forget to move this element, no damage could occur since the main valve would merely remain closed but should he forget to manipulate the controlling element in a like mechanism having a normally open main valve, steam would pass freely through the line and possibly cause great damage.

When it is desired to equip the shut-off valve to act as a throttle valve, the cover plate 28 is replaced by a cover plate 78, as shown in Fig. 2, having a yoke 80 threaded to receive the spindle 82 of a hand wheel 84. The inner end of the spindle 82 extends through a stuffing box 86 and the cover plate 78 into the inner end of a boss 79 which is formed on the inner face of the cover plate 78 and provided with a longitudinal bore for the purpose of guiding the valve stem 22. It will be seen that by turning the hand wheel 84 in the proper direction, the spindle 82 is moved inwardly against the end of the valve stem 22 and the valve forced positively toward or upon its seat. It will be apparent that the main valve may be partially closed in this way without in any way affecting its automatic shut-off action, as the piston 34 is merely displaced somewhat nearer to the end of the pressure chamber 32. The valve will, therefore, act automatically in whatever position of initial adjustment may be imparted to it by manipulating the hand wheel 84. At the same time, the main valve may be closed positively and held closed by the hand wheel without being in any way hampered or in any way disorganizing the mechanism provided for operating it automatically.

While I have referred to the valve of my invention as designed for steam engine and turbine installations, it is not limited in this respect but is of general application in any system wherever it may be desired to shut off the steam supply for any purpose. For example, in service systems working under moderate or low conditions of pressure, my valve may be employed as a safety device to guard the system against being subjected to excessive pressure. In such an installation, the controlling device for the auxiliary valve will take the form of a diaphragm chamber wherein a spring-controlled diaphragm is responsive to pressure above a predetermined degree. If, through failure of a reducing valve or otherwise, high pressure is admitted to the system, the diaphragm will be moved to trip the latch and permit the shut-off valve to act. It will be apparent, therefore, that so far as my invention is concerned, the character of the installation and the type of controlling device are of secondary importance only.

Having thus described my invention, what I claim as new and desire to secure by Letters Patent of the United States is:

1. An automatic cut-off valve including a valve casing having a valve seat and a pressure chamber contained therein, a valve guided for movement toward and from said seat and carrying a piston working in said pressure chamber, movement of the piston inwardly of the chamber moving the valve in the closing direction toward its seat, means providing an exit port leading outwardly from said chamber, an auxiliary valve for closing the port, spring means comprising two spring portions surrounding the auxiliary valve stem, one portion acting normally to hold the auxiliary valve in the open port position, and means including a releasable latch adapted to act through the other spring portion to hold the auxiliary valve in its port-closing position against the action of said one spring portion.

2. An automatic cut-off valve including a valve casing having a valve seat and a pressure chamber contained therein, a valve guided for movement toward and from said seat and carrying a piston working in said pressure chamber, means providing an exit port leading from said chamber, an auxiliary valve for closing the port, a member housing the outer portion of the auxiliary valve stem, a lever cooperating with the member, spring means within the member, cooperating with the auxiliary valve and housing member to force the member outwardly and the auxiliary valve away from its seat, operation of the lever inwardly against the member being adapted to close the port, and a releasable latch for holding the lever in the port-closing position.

3. An automatic cut-off valve including a valve casing having a valve seat and a pressure chamber contained therein, a valve guided for movement toward and from said seat and carrying a piston working in said pressure chamber, means providing an exit port leading from said chamber, an auxiliary valve for closing the port, a member housing the outer portion of the auxiliary valve stem, a collar on said stem, a spring on the stem at one side of the collar for moving the auxiliary valve away from its seat, a spring on the stem at the other side of the collar for moving said housing member outwardly on the stem, a lever cooperating with said member, operation of the lever against the member being adapted to compress the springs and close the port, and a releasable latch for holding the lever in the port-closing position.

WILLIAM A. HEANEY.